(12) United States Patent
Jonker

(10) Patent No.: US 7,651,699 B2
(45) Date of Patent: Jan. 26, 2010

(54) AUTOINDUCER COMPOUNDS AND THEIR USES

(75) Inventor: Jan Jonker, Cardiff (GB)

(73) Assignee: Pathway Intermediates Limited, Market Drayton, Shropshire (GB)

( * ) Notice: Subject to any disclaimer, the term of this patent is extended or adjusted under 35 U.S.C. 154(b) by 70 days.

(21) Appl. No.: 10/250,842

(22) PCT Filed: Jan. 8, 2002

(86) PCT No.: PCT/GB02/00072

§ 371 (c)(1),
(2), (4) Date: Jan. 14, 2004

(87) PCT Pub. No.: WO02/052949

PCT Pub. Date: Jul. 11, 2002

(65) Prior Publication Data

US 2004/0115245 A1 Jun. 17, 2004

(30) Foreign Application Priority Data

Jan. 8, 2001 (GB) ................. 0100387.0
Apr. 18, 2001 (GB) ................. 0109477.0

(51) Int. Cl.
*A61K 38/17* (2006.01)
(52) U.S. Cl. ........................ 424/442; 424/451; 424/464; 424/438; 424/439; 424/489
(58) Field of Classification Search ........................ None
See application file for complete search history.

(56) References Cited

U.S. PATENT DOCUMENTS

| | | | | |
|---|---|---|---|---|
| 4,616,016 A | | 10/1986 | Lechtken et al. | |
| 4,994,379 A | * | 2/1991 | Chang | 435/69.1 |
| 5,169,634 A | * | 12/1992 | Ellingsen et al. | 424/442 |
| 5,591,872 A | * | 1/1997 | Pearson et al. | 549/321 |
| 5,593,827 A | * | 1/1997 | Bycroft et al. | 435/6 |
| 5,698,246 A | * | 12/1997 | Villamar | 426/54 |
| 6,057,288 A | * | 5/2000 | Pearson et al. | 514/2 |
| 6,337,347 B1 | * | 1/2002 | Livinghouse | 514/471 |
| 6,395,282 B1 | * | 5/2002 | Kende et al. | 424/197.11 |
| 6,723,321 B2 | * | 4/2004 | Greenberg et al. | 424/185.1 |
| 6,936,447 B1 | * | 8/2005 | Pearson et al. | 435/183 |
| 2003/0078231 A1 | * | 4/2003 | Wilburn | 514/45 |
| 2003/0095985 A1 | * | 5/2003 | Kende et al. | 424/203.1 |
| 2003/0171371 A1 | * | 9/2003 | Bycroft et al. | 514/231.5 |

FOREIGN PATENT DOCUMENTS

| | | |
|---|---|---|
| EP | 0 479 570 A2 | 4/1992 |
| EP | 0 943 609 | 9/1999 |
| GB | 1 205 638 | 9/1970 |
| JP | 110-75709 | 3/1999 |
| JP | 2000-69985 | 3/2000 |
| WO | WO 92/18614 | 10/1992 |
| WO | WO 97/27851 | 8/1997 |
| WO | WO 98/58075 | 12/1998 |
| WO | WO 01/74801 A1 | 10/2001 |
| WO | WO 02/00035 A1 | 1/2002 |

OTHER PUBLICATIONS

Shapiro, J.A., "Bacteria as Multicellular Organisms", Scientific American, 246: 62-69 (Jun. 1988).
Eberhard, A., et al., "Structural Identification of Autoinducer of *Photobacterium fischeri* Luciferase", Biochemistry 20: 2444-2449 (1981).

* cited by examiner

*Primary Examiner*—M P Woodward
*Assistant Examiner*—Hasan S Ahmed
(74) *Attorney, Agent, or Firm*—Patrick J. Hagan; Dann, Dorfman, Herrell and Skillman, P.C.

(57) ABSTRACT

The present invention discloses the autoinducer compounds, such as acyl homoserine lactones, acyl homocysteine lactone, acyl thiolactones, furanones or signal peptides, and their use in animal feed additives and animal feeds to improve animal performance.

15 Claims, No Drawings

AUTOINDUCER COMPOUNDS AND THEIR USES

FIELD OF THE INVENTION

The present invention relates to autoinducer compounds, otherwise known as quorum sensing molecules, and to their uses, in particular as additives to animal feeds for improving animal performance.

BACKGROUND OF THE INVENTION

It has been observed that bacteria in both single culture and mixed cultures are likely to derive significant benefit from the ability to co-ordinate their population dynamics (Shapiro, 1988). 'Quorum sensing' as this mechanism is known is the ability of bacteria to link gene expression with population density. Signals produced by the organism are expressed into their environment and upon critical quorum signalling then activate a response regulator. This allows single cells to interact with others of their same and different species. In this manner, bacteria can coordinate their production of defence chemicals, differentiation, reproduction and migration.

Hitherto, by far the most studied applications of the quorum sensing signal compounds has been in the preparation of diagnostics and the stimulation in vitro of otherwise transiently available antibiotic compounds. It is now recognised that many bacterial species utilise this signal transduction process by means of a small range of simple molecules serving as autoinducers of virulence and other characteristics. The first molecule to be identified was N-(3-oxohexanoyl) homoserine lactone (OHHL) as the inducer of bioluminescence in *Vibrio fisheri* in 1981 (Eberhard et al, 1981).

In Vibrio species, OHHL production is reliant on density dependent lux gene transcription activated by a protein LuxR. The product Lux1 binds with LuxR and OHHL to become activated. This then is the general model process for the coordination of various phenotype expression. It was subsequently found that OHHL was part of a group of compounds, the acyl homoserine lactones (AHLs), many of which (both natural and synthetic) have signalling ability. Other molecules that are known to be quorum sensing signals or autoinducers include various peptides such as 'competence signalling peptide' in *Bacillus subtilis* and *Streptococcus pneumoniae*.

Of the AHLs, N-(3-hydroxybutanoyl) homoserine lactone; N-hexanoyl homoserine lactone; N-butanoyl homoserine lactone; N-(3-oxooctanyl) homoserine lactone; N-octanoyl homoserine lactone; N-(3-oxodecanoyl) homo serine lactone; N-octanoyl homoserine lactone; 7,8-cis-N-(3-hydroxytetradecanoyl) homoserine lactone and other analogues have also been shown to be active. Other quorum sensing signals are known to be utilised by certain organisms including 3-hydroxypalmitic acid methyl ester.

The AHLs appear to be utilised only in the Gram negative bacteria, while Gram positive bacteria appear to use thiolactone peptide signalling molecules and other oligopeptides fragments for cell signalling.

The manipulation of the rumen and gut microbiology has hitherto been accomplished using antibiotics, including antimicrobials such as virginiamycin. In the past, many different types of natural and artificial compounds, including sulphonamides, tetracyclines and penicillin have been used. Their primary function has been to modify the rumen microbial populations in such a way as to reduce the undesirable bacteria and favour the beneficial bacteria.

However, there is increasing concern about the long term consequences of the use of these compounds in sub-therapeutic concentrations with fears that resistance to these drugs may now be widespread.

The complex work done in the rumen reticulum to convert cellulose, hemicellulose and lignins into available energy, while at the same time providing the host animal with on-going source of protein, is achieved by a community of bacterial species. This community is intensely competitive. Low methane producing rumen systems that are good producers of propionates are better at delivering energy to the animal. The optimisation of the rumen to this end has been the enduring target of drug and nutritional intervention. The major aim therefore is to maximise microbial protein production and cellulose/lignin-type compound degradation, while minimising negative aspects of undesirable microbial growth. The organisms that consume or degrade protein and increase (energy consuming) methane production are themselves non-mutualistic in their relationship with the host or deprive the animal of available starch and are therefore considered deleterious to optimal rumen fermentation.

The difficulty in using feed additives or other bioactive treatments is that of specificity as many substances have multifold effects on the microbial community. Reduction of proteolysis and deamination activity is partly responsible for increased performance of the animal. The control of the microbial population can also positively influence the production of volatile fatty acids and reduce methane production. The combined manipulation of these parameters results in improved animal performance, sometimes by very substantial margins.

WO97/27851 (The Johns-Hopkins University) discloses that the growth of Mycobacteria can be inhibited through the administration of homoserine or a homoserine lactone. The application suggests that these compounds are used in the diagnosis and treatment of *M. tuberculosis* infection in humans.

U.S. Pat. No. 5,591,872 (University of Iowa) discloses that N-(3-oxododecanoyl) homoserine lactone is an autoinducer which regulates gene expression in *Pseudomonas aeruginosa* and says that analogs or inhibitors of this autoinducer can be used in treating or preventing infection by this microorganism.

WO01/74801 (University of Nottingham) discloses a family of N-acyl homoserine lactones and their use as immunosuppressants.

SUMMARY OF THE INVENTION

Broadly, the present invention relates to the synthesis and use of quorum sensing molecules or autoinducers in animal diets, particularly in feedstuffs for ruminant and monogastric animals. Recent legislative changes have made the use of most antibiotics illegal in many Western countries and the new solutions have been sought to improve fermentation using more natural antimicrobials. However, many of these natural products have unreliable efficacy records and are themselves likely to be scrutinised by the regulatory authorities. Therefore, a completely new approach to the optimisation of fermentation is desirable. The use of autoinducer compounds or quorum sensing signals in animal feed as disclosed in the present invention provides a novel way of controlling the dynamics of the rumen flora using the very compounds the natural microbial population produce themselves.

In the present invention, the terms 'quorum sensing molecule' and 'autoinducer compound' are used interchangeably. Examples of these compounds are set out below.

In a first aspect, the present invention provides an animal feed additive comprising one or more autoinducer compounds. Optionally, the autoinducer compound is admixed with an inert carrier to bulk it up prior to mixing with animal feed ingredients, provided as a solution for adminstration as a drench or for spraying onto animal feed, or formulated in tablet form, again with an inert carrier. Examples of inert carriers include silica-talc and water.

In a further aspect, the present invention provides an animal feed comprising an animal feed component and one or more autoinducer compounds. Examples of animal feed components include one or a combination of proteins, sugars, fats and fibre. Typically, animal feed components are derived from cereals and other plant material.

In a further aspect, the present invention provides a non-therapeutic method of improving animal performance comprising administering an autoinducer compound to the animal.

In a further aspect, the present invention provides the use of an autoinducer compound for administering to an animal for the purpose of improving animal performance.

Examples of autoinducer compound or compounds include acyl homoserine lactones, acyl homocysteine lactones, acyl thiolactones, signal peptides and signal furanones and quinolines, such as 2-heptyl-3-hydroxy-4-quinoline. Preferably the acyl lactones are $C_{1-20}$ acyl lactones.

Examples of preferred acyl homoserine lactones include compounds such as N-oxobutanoyl homoserine lactone, N-oxopentanoyl homoserine lactone, N-oxohexanoyl homoserine lactone, N-oxoheptanoyl homoserine lactone, N-oxooctanoyl homoserine lactone, N-oxononanoyl homoserine lactone, N-oxodecanoyl homoserine lactone, N-butanoyl homoserine lactone, N-pentanoyl homoserine lactone, N-hexanoyl homoserine lactone, N-heptanoyl homoserine lactone, N-octanoyl homoserine lactone, N-nonanoyl homoserine lactone, N-decanoyl homoserine lactone, and 7,8-cis-N-(3-hydroxytetradecanoyl) homoserine lactone. N-oxoacyl homoserine lactones are preferably N-(3-oxoacyl) homoserine lactones such as. The synthesis of further examples of acyl homoserine lactones is described in WO01/74801.

Examples of preferred acyl homocysteine lactones include compounds such as N-oxobutanoyl homocysteine lactone, N-oxopentanoyl homocysteine lactone, N-oxohexanoyl homocysteine lactone, N-oxoheptanoyl homocysteine lactone, N-oxooctanoyl homocysteine lactone, N-oxononanoyl homocysteine lactone, N-oxodecanoyl homocysteine lactone, N-butanoyl homocysteine lactone, N-pentanoyl homocysteine lactone, N-hexanoyl homocysteine lactone, N-heptanoyl homocysteine lactone, N-octanoyl homocysteine lactone, N-nonanoyl homocysteine lactone, and N-decanoyl homocysteine lactone.

Examples of preferred acyl thiolactones include compounds such as N-oxobutanoyl thiolactone, N-oxopentanoyl thiolactone, N-oxohexanoyl thiolactone, N-oxoheptanoyl thiolactone, N-oxooctanoyl thiolactone, N-oxononanoyl thiolactone, N-oxodecanoyl thiolactone, N-butanoyl thiolactone, N-pentanoyl thiolactone, N-hexanoyl thiolactone, N-heptanoyl thiolactone, N-octanoyl thiolactone, N-nonanoyl thiolactone, and N-decanoyl thiolactone.

In other embodiments, the autoinducer compounds are represented by one of the formulae:

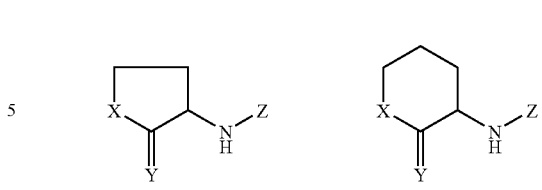

wherein X and Y are independently selected from O, S or NH and Z is a substituted or unsubstituted $C_1$ to $C_{20}$ acyl chain. The acyl chain may be branched or unbranched, unsaturated, partially saturated or saturated. Examples of acyl chain substituents include keto, hydroxy, alkenyl or phenyl substituents. The autoinducer compound may be partially or completely halogenated.

In embodiments in which the autoinducer compound is chiral, it may be present as a single enantiomer or any mixture of optical isomers.

In addition to the autoinducer compound, the animal feed additive or animal feed may contain other ingredients such as antibiotics, such as Tylsine, tetracycline, gentamycin, bactracin-methylene-disalicylate and valnemulin, or coccidiostats such as salinomycin.

In the present invention, the term 'improving animal performance' includes improving animal growth rates, improving animal weight at a given age, improving feed conversion ratio, improving the yield or quality of a product produced by or derived from the animal (e.g. meat (e.g. from livestock, poultry or fish), milk from lactating livestock or eggs from poultry), all of these being defined in relation to control animals who are untreated with the autoinducer compound. These comparisons can be readily made by those skilled in the art, e.g. feed conversion ratio can be calculated on the basis of feed consumed/total weight of animals in a sample.

While not wishing to be bound by any specific theory, the applicants believe that the inclusion of autoinducer compounds in animal diet has a beneficial effect on the populations of bacteria in the digestive tract of animals. This effect may be in the regulation of gene expression in animal gut bacteria in vivo, in the promotion of surfactant production by gut flora as surfactants can aid in the emulsification of the fat or lipid content of feed making it more readily available to the animal, in the promotion of virulence in specific rumen fluid bacteria or in the production of antibiotics by monogastric gut bacteria.

The autoinducer compounds may be administered to animals such as birds, livestock, marine animals or domestic or companion animals. Examples of these animals include poultry, cattle, swine, sheep, rabbits, horses, dogs and cats, and fish, e.g. in aquatic farming.

Preferably, the autoinducer is administered directly or indirectly to an animal at a dose equivalent to 1 to 100,000 nanomoles per tonne of feed, more preferably 100 to 10,000 nanomoles per tonne of feed, and most preferably about 1,000 nanomoles per tonne of food.

The autoinducer compound can be provided to the animal by a wide range of routes. As an animal feed additive it can be formulated as a dry powder (e.g. for mixing with animal feeds), a liquid (e.g. for spraying onto animal feeds or animal drinking water), or formulated for direct application into animal feeds. Alternatively, the autoinducer compound can be supplied premixed with an animal feed or administered directly to the animal as a supplement. Additionally or alternatively, a composition comprising the autoinducer compound may be in the form of a capsule or tablet, formulated as a drench or be in the form of a bolus for the ingestion by an animal. In these embodiments, the autoinducer compound may be formulated by admixing it with an inert carrier, e.g. a solvent such as water or a solid carrier such as silica talc, to making dosing easier in the field.

In a further aspect, the present invention provided a method of making an animal feed, the method comprising mixing one or more animal feed components with one or more autoinducer compounds. The method may comprise additional steps in the processing of the feed, e.g. pellitisation.

In some embodiments, the autoinducer compounds may be made by synthetic chemistry techniques. Alternatively, the compounds may be derived from extracts or concentrates of plants, algal, fungal or bacterial material. As a further alternative, the autoinducer compounds can be derived from genetically modified organisms that over-express the autoinducer compounds, either naturally or because they have been transformed. Examples of transformed organisms include bacteria or plant cells transformed with nucleic acid encoding autoinducer compounds such as an acyl homoserine, homocysteine or thiolactone lactone synthase gene or gene cluster or with nucleic acid encoding a signal peptide. The transformed host cells may then be induced to express the autoinducer compound which optionally may then be purified from cell culture and formulated as described above. Alternatively, an animal feed or animal feed additive may be directly made from the bacteria or plant cells, e.g. by making an animal feed from a plant which has been genetically engineered to over-express one or more of the autoinducer compounds.

In a further aspect, the present invention provides a method of preparing acyl homoserine lactone compounds, the method comprising refluxing amino butyrolactone with an acetate compound to produce the acyl homoserine lactone. In this method, preferably the solvent employed is toluene, xylene or ethylbenzene, and more preferably the solvent is toluene. Preferred reactions conditions are refluxing the reaction mixture under atmospheric pressure.

Preferably, the acetate compound is ethyl butanoate, ethyl pentanoate, ethyl hexanoate, ethyl heptanoate, ethyl octanoate, ethyl nonanoate, ethyl decanoate, ethyl 3-oxobutanoate, ethyl 3-oxopentanoate, ethyl 3-oxohexanoate, ethyl 3-oxoheptanoate, ethyl 3-oxooctanoate, ethyl 3-oxononanoate or ethyl 3-oxodecanoate.

The method may comprise the additional step of purifying the acyl homserine lactone produced in the reaction. In one embodiment, this can be achieved by evaporating the product, redissolving in 5% methanol in dichloromethane and purified by column chromatography.

By way of example and not limitation, embodiments of the present invention will now be described in more detail.

DETAILED DESCRIPTION

EXAMPLE 1

Effect of Dietary Lactones on the Digestion of Grass Silage by Cultures of Rumen Fluid from Healthy Fistulated Grass Fed Cows Autoinducer compounds such as acyl homoserine lactones can have significant effects on cultures of bacteria. For example, they may be used to induce expression of antibiotics and extracellular enzymes. Hexanoyl homoserine lactone (OHHL) is the signal molecule for antibiotic production in *Chromobacterium violaceum;* butanoyl homoserine lactone triggers various phenotypes in *Pseudomonas aeruginosa* including the production of various enzymes and lectins. OHHL is known to have different effects on different species. For example, in *Erwinia stewartii* it induces production of exopolysaccharides, while in Vibrio species it promotes bioluminescence. Thus, in a complex mixed culture comprising many species including *ruminobacter* sp., *prevotella* sp., *ruminococcus* sp., it is hard to predict the specific phenotypes that will be induced by even the introduction of just one autoinducer compound. However. the global effect on rumen mixed culture fermentation can be measured in terms of the efficiency of digestion of forage. In the following example, an in vitro model of animal rumen efficiency reveals the net effect on the digestion of forage using fresh rumen fluid. A control sample treated with water and four test samples treated with using nanomolar concentrations of OHHL are examined.

Rumen fluid was collected from a healthy fistulated grass fed cow and immediately dispensed into 75 ml bottles. These bottles were kept at 37° C. Into each of these cultures approximately 1 g of pre-weighed, pre-dried grass silage was suspended in sachets made from nylon gauze. Signal AHL [OHHL] was introduced at this point. in concentrations that provided final concentrations in the rumen fluid of 0, 200, 500 and 1000 nanomoles. These were then incubated for 10 hours. The forage samples were then removed and re-dried and re-weighed. Each treatment was conducted in triplicate.

The results of the experiments showed that increasing the amount of OHHL present increased the mean percentage loss of weight for each treatment, indicating that the presence of autoinducer compounds leads to improved efficiency in the digestion of animal feed.

When added to feed the inclusion level should be increased from the above levels to allow for losses during the feed extrusion processes. For this reason, a typical inclusion rate of 5-5000 nanomoles is usually sufficient.

EXAMPLE 2

Synthesis of an Autoinducer Compound

Very few of the AHL compounds are available commercially and synthesis protocols in the literature involve many steps and low yields. It was thus important that an inexpensive synthetic route was perfected that can serve as the model route for all of the AHL compounds. OHHL which is pure by NMR was prepared as follows.

To a stirred mixture of α-amino-γ-butyrolactone (1.0 eq) in toluene (~5 ml/per mmol) was added triethylamine (1.0 eq) dropwise. The mixture was then stirred for 10 minutes. Ethylbutyryl acetate (1.0 eq) was added dropwise and the mixture refluxed for 2 hours. The mixture was allowed to cool and was then filtered and evaporated. Column chromatography with 5% methanol in dichloromethane gives the compound in >30% overall yield.

NMR analysis confirmed the presence of OHHL: Probe head 5 mm $H^1$; AQ 1.9923444 sec; TE 300.0K 1 D NMR plot parameters: cx 40.0 cm; F1P 10.5 ppm; F2P—0.500 ppm; 110.03576 Hz/cm NMR δvalues for OHHL: 7.609 ppm; 4.525 ppm; 4.412 ppm; 4.20 ppm; 3.402 ppm; 2.677 ppm; 2.45 ppm; 2.16 ppm 1.56 ppm 0.844 ppm.

It is known that AHL's are present in the rumen (Erickson et al, 2000). Reverse phase thin layer chromatography of rumen fluid revealed the presence of 'multifold' signals.

It is thus clear that many of the bacterial species already derive competitive benefit from quorum sensing mechanisms.

As described, synthetic signal compounds may be introduced to the rumen in small doses through the animal feed to improve rumen efficiency and therefore improve animal performance. It is known that multiple lactone signals regulate virulence determinants in species such as Pseudomonas sp. Quinolones such as 2-heptyl-3-hydroxy-4-quinoline are also active signal molecules and may also be utilised to improve animal nutrition and health.

Combinations of the AHL compounds may be used to further manipulate rumen events, but the precise formulations into the feedstuff will necessarily depend upon the species and feedstuff concerned. Signal eavesdropping, where an optimised cow rumen is analysed for signals that are then artificially reproduced and then introduced is another option. Similarly, in monogastrics, quorum sensing signals may be utilised to stimulate the production of antibiotics by beneficial gut flora. Additionally, other beneficial bacterial products such as enzymes and surfactants may also be induced using this technology.

Inactive analogues of signal molecules can be used to competitively interfere with the signalling process ('signal jamming'). In this scenario, transcription of, for example, virulence genes of deleterious gut bacteria, can be forestalled and pathogenic damage mitigated. The subsequent improvement in animal health will thus contribute to overall animal performance. It may be possible to harvest signal molecules from cultures in in vitro fermentation and signal peptides (typically the quorum sensing signals for Gram positive bacteria) could be prepared by genetic manipulation, for example to allow over-expression of peptides such as the oligopeptides used by *Enterococcus faecilis*.

EXAMPLE 3

Effect of Dietary Lactones on Growth Performance and Mortality of Broiler Chickens Raised in Floor Pens Materials and Methods This experiment examined the effect of N-(3-oxohexanoyl)-L-homoserine lactone (OHHL) (CAS #: 143537626, molecular formula : $C_{10}H_{15}NO_4$, molecular weight: 213) on the growth performance and mortality of broiler chickens.

A stock solution of 1 mM OHHL (0.213 g/L) was prepared as follows. Approximately 50% of the required volume of distilled water was warmed to approximately 30-40° C. and used to dissolve the required amount of OHHL powder. The solution was made up to volume using distilled water stored at room temperature. OHHL solution (0.213 g/L) was applied to treated crumbled feed at a rate of 3 kg per tonne. Control feed was treated with distilled water at a rate of 3 kg per tonne. The OHHL solution was stored for less than 2 days prior to application to feed.

The antibiotic BMD®110 was used as a positive control in this study. The active ingredient is bacitracin methylene disalicyclate. The product contains 110 g of bacitracin activity per kg and is approved for prevention of necrotic enteritis in broiler chickens when given at a dose of 55 ppm in feed (500 g BMD®110/tonne feed).

Coxistac® 6% premix was used as an ionophore in all study diets as an aid in the prevention of coccidiosis. The product contained 60 g salinomycin per kg and was administered at a dose of 60 ppm in feed (1 kg Coxistac® 6% premix per tonne feed).

The experiment lasted 35 days with the day of placement of broiler chicks considered as day zero. A total of 1,200 male day-old broiler chickens (Cobb×Cobb) were assigned to treatment on day 0. Birds were vaccinated for Marek's disease at the hatchery. Twenty-four pens, each providing 45 square feet of floor space, were assigned to treatment groups. Each pen had a concrete floor and a 12-inch high concrete barrier at the front and back. Adjacent pens were separated by a solid 12-inch high plastic barrier at bird level. A welded wire fence with 1-inch square openings was located on top of all barriers. Each pen was permanently identified by number and contained 50 birds on day zero. Each pen contained four nipple-type drinkers which provided clean drinking water ad libitum. Dry feed was provided ad libitum in tube-type feeders (one per pen) of 20 kg capacity.

The barn was heated by five natural gas heaters which were equally spaced and positioned to warm incoming air at the north wall of the building. Air was exhausted by fans located on the south-facing wall of the building. Lighting program, barn temperature, and other management practices were typical of commercial broiler chicken producers in North America. Birds that were moribund and unable to reach food or water were culled and euthanised by carbon dioxide gas.

Bodyweight, pen number and date of death were recorded for each bird that was culled or found dead. Mortalities were submitted to the pathologist to determine the apparent cause of death.

A randomised complete block design was used to study the main and interactive-effects of OHHL (O and 0.639 g/tonne) and dietary antibiotic (0 and 55ppm BMD®110)in a 2×2 factorial arrangement. Dietary treatments were as follows:

| Treatment code | OHHL, g/tonne | BMD ® 110, g/tonne |
|---|---|---|
| A | 0 | 0 |
| B | 0.639 | 0 |
| C | 0 | 500 |
| D | 0.639 | 500 |

*All diets contained 60 ppm salinomycin (Coxistac ®)

There were four pens per block and six replicate blocks for a total of 24 pens.

The feeding program was used in the study used a starter feed type on days 0 to 20 and a grower feed type on days 21 to 35. Diet formulation was representative of commercial diets in North America.

A starter diets using a basal mix of starter diet containing either 0 or 55 ppm BMD was manufactured, pelleted, and crumbled. Bagged starter feed was treated with either distilled water (0 g OHHL per L) or OHHL solution (0.213 g OHHL per L) using a horizontal double ribbon mixer of 100 kg capacity. Distilled water or OHHL solution (0.213 g per L) were applied to crumbled feed at a rate of 3 kg per tonne feed. Grower diets were manufactured as described above for starters.

Feed sampling and assay: a minimum of 10 representative samples were taken from each batch of crumbled basal starter and grower feed. The 10 samples were composited and divided into two samples for nutrient assay and retainer sample, respectively. A representative composite sample of each control and OHHL-treated feed were taken. Duplicate samples (analytical and retainer) were stored frozen at −20° C. for retrospective OHHL assay. One sample of each crumbled basal feed was analysed for dry matter, crude protein, calcium, phosphorus and manganese.

The data collected consisted of:
1. Bodyweight on days 0, 21, and 35.
2. Amounts of each feed (starter and grower) consumed.
3. Bodyweight and date of death for birds which were culled or died.
4. Feed conversion ratio was calculated on a pen basis as feed consumed/[total weight of live birds+total weight of dead and culled birds+total weight of sacrificed birds].
5. Average bodyweight per pen was calculated as total weight of live birds at time of weighing/number of live birds at time of weighing.
6. Daily feed intake per bird was calculated on a pen basis for the starter and grower periods as total feed consumed divided by number of live bird days in the specified period.
7. Apparent cause of death was recorded for all birds that died or were culled.
8. Birds were observed on a flock basis at least once daily and observations recorded.
9. Cause of death.

Statistical Analysis

The pen was the experimental unit for statistical analysis. Mortality data was transformed using an arcsine transformation (Steel and Torrie, 1980) prior to analysis of variance. All data were analysed by analysis of variance using the following model:

| Source | Degrees of freedom |
| --- | --- |
| OHHL | 1 |
| Antibiotic | 1 |
| OHHL × Antibiotic | 1 |
| Block | 5 |
| Residual error | 15 |
| Total | 23 |

Means were compared using an appropriate multiple range test (Steel and Torrie, Principles and procedures of statistics, a biometrical approach. McGraw Hill Book Co., NY., 1980).

Results and Discussion

Dietary administration of OHHL significantly improved (P=0.024) Day 21 bodyweight of broiler chickens (Table 1). There was no significant effect of dietary BMD on bodyweight.

Administration of OHHL improved feed efficiency of broilers on Day 21 (P=0.012) and for the overall Day 0-35 period (P=0.055). Dietary BMD also improved feed efficiency for the Day 21-35 period (P<0.001) and the overall growth period (P=0.014).

There was a significant OHHL×BMD interaction effect for feed efficiency during the starter period. However, this is attributable to a poor feed efficiency in birds that received only BMD in the starter period (feed efficiency=1.422). The feed efficiency response to OHHL in combination with BMD was slightly greater than the response to OHHL alone.

Morbidity and Mortality

Old litter was used in the present study in an attempt to create a substantial disease challenge. However, overall mortality was very low in comparison to commercial norms of 4 to 5%. In the absence of BMD, OHHL reduced mortality from 2.0% to 1.7%. In the presence of BMD, OHHL reduced mortality from 3.3% to 2.7% (Table 2). These numeric changes in mortality are not statistically significant but do provide preliminary evidence that continuous administration of OHHL did not have an adverse effect on bird survival.

The final bodyweights and feed efficiency data also suggest excellent growth performance and minimal flock morbidity.

All mortalities were necropsied and there was no evidence of unusual or adverse drug effects in the study.

Conclusions

Continuous administration of OHHL to broiler chickens improved Day 21 bodyweight (P=0.024) and overall feed efficiency (P=0.055).

Mortality of OHHL-treated broilers was numerically lower than non-OHHL treated controls both in the presence and absence of dietary BMD.

There was no evidence of any adverse effect of OHHL on bird health.

EXAMPLE 4

Effect of Dietary Lactones on Rumen Dry Matter Disappearance in Sheep

Materials and Methods

This experiment examined the effect of N-(3-oxohexanoyl)-L-homoserine lactone (OHHL) (CAS#: 143537626, molecular formula : $C_{10}H_{15}NO_4$, molecular weight: 213) on rumen dry matter disappearance in vivo in sheep.

A stock solution of OHHL (0.639 gram/L) was prepared as follows. Approximately 50% of the required volume of distilled water was warmed to approximately 30-40° C. and used to dissolve the required amount of OHHL powder. The volumetric flask was made up to volume using distilled water stored at room temperature. OHHL solution was applied to pelleted sheep ration at a rate of 3 kg per tonne of feed. Control feed was treated with 3 kg of distilled water per tonne.

A batch mixer and appropriate spraying device were used to ensure uniform application of liquid to the feed. Control feed was manufactured first to avoid cross contamination with OHHL. It was anticipated that sheep ration would comprise approximately one third of total dry matter intake of study animals based on an estimated dry matter intake of 2% of bodyweight.

Initial attempts to administer OHHL by application of an aqueous solution to the outside of pelleted feed were modified as the sheep decreased intake of treated feed after a few days. Instead, OHHL was administered as an oral drench twice daily commencing on the afternoon of Day 11 of each period.

Animals were individually penned to minimize the potential for damage to cannulae and to permit individual feeding. Fresh drinking water was provided ad libitum.

A restricted quantity of pelleted ration was provided at a rate of approximately 0.5 kg/day (0.25 kg in the a.m. and 0.25 kg in the p.m.). Access to hay was restricted as needed to help ensure that sheep ration was consumed.

On Days 12 and 13, pelleted ration (0.25 kg/animal) was issued to animals approximately 1 hour prior to introduction of bags into the rumen and again following removal of the 8-hour bag from each animal.

One fresh sample of corn silage was dried to constant weight and allowed to cool to room temperature. A representative sub-sample was taken for dry matter determination. The sample was ground to pass a 1 mm screen, mixed and sampled for dry matter assay. The remaining sample was stored for in situ determination of dry matter disappearance from the rumen of cannulated sheep.

Ankom rumen sampling bags were used in the study. Each bag was approximately 5 cm×10 cm, suitable for a one-gram sample. Pore size was 53±10 microns. Dried, ground corn silage was weighed (1.00±0.01 grams) into bags and sealed. A set of four bags was prepared per animal per day and these were attached to a string to facilitate placement in and removal from the rumen. A fifth bag served as a blank for each set of four bags. The blank was not placed in the rumen but was washed, processed and dried.

A rumen cannula was surgically placed in each of five mature (approximately 3-year old) ewes. Following recovery from surgery, four of these animals were selected for use in the study. The fifth animal served as a reserve for use in the event of post-surgical complications in a study animal.

Dry matter disappearance was measured by removing bags from the rumen at 4, 8, 12 and 24 hours and washed under cold running tap water together with a corresponding blank bag. Bags were then dried to constant weight. Measurement of dry matter disappearance was completed for each animal commencing on the morning of Day 12 and Day 13 of each period.

A Latin Square Design was used to study the effects of two treatments:

A, Control: 0 gram OHHL per tonne ration.
B: Treated with the equivalent of 1.917 gram OHHL per tonne ration.

Each period was of 14 days duration. A total of four study animals were blocked based on bodyweight (2 blocks). Animals within block were randomly assigned to Sequence 1 or 2:

|  | Sequence 1 | Sequence 2 |
|---|---|---|
| Period 1 | Treatment A | Treatment B |
| Period 2 | Treatment B | Treatment A |

Statistical Analysis

Data were analysed by a multiple regression analysis that included effects of treatment, animal, period, study day and hour.

Animal Health

In Period 1, prior to measurement of in situ dry matter disappearance, one OHHL-treated sheep was removed from study due to poor appetite and was replaced with a reserve animal. The removed animal was euthanized, necropsied and found to have a liver abscess developed prior to the experiment.

Dry Matter Disappearance

There was a highly significant ($P<0.0001$) effect of rumen incubation time on dry matter disappearance as expected. After 4 and 24 hours of incubation, approximately 50% and 75% of dry matter had disappeared from Ankom bags (Table 1). Dry matter disappearance was measured on two consecutive days in each period but there was no significant ($P=0.97$) effect of day on this variable.

Treatment means are summarized in Tables 3 and 4. OHHL improved ($P=0.105$, Table 2) mean dry matter disappearance by 1.77 percentage units. The magnitude of the response varied considerably with incubation times but this is largely a reflection of the variation inherent in such measurements.

Conclusions

The experiment shows that administration of OHHL improved ($P=0.105$) dry matter disapearance of corn silage in the rumen of sheep.

TABLE 1

OHHL and BMD effects on bodyweight and feed intake of broiler chickens

| OHHL (1 = no; 2 = yes) | BMD (1 = no; 2 = yes) | Average bodyweight, kg | | | Daily Feed intake | | |
|---|---|---|---|---|---|---|---|
| | | Day 0 | Day 21 | Day 35 | Day 0-21 | Day 21-35 | Day 0-35 |
| 1 | | 0.0416 | 0.762 | 1.922 | 0.048 | 0.147 | 0.087 |
| 2 | | 0.0415 | 0.785 | 1.937 | 0.048 | 0.147 | 0.087 |
| Significance | | | NS | 0.024 | NS | NS | NS |
| | 1 | 0.0416 | 0.781 | 1.922 | 0.048 | 0.147 | 0.087 |
| | 2 | 0.0415 | 0.766 | 1.937 | 0.048 | 0.147 | 0.087 |
| Significance | | NS | NS | NS | NS | NS | NS |
| 1 | 1 | 0.0415 | 0.767 | 1.910 | 0.047 | 0.148 | 0.087 |
| 2 | 1 | 0.0417 | 0.796 | 1.934 | 0.049 | 0.147 | 0.088 |
| 1 | 2 | 0.0416 | 0.758 | 1.934 | 0.049 | 0.147 | 0.087 |
| 2 | 2 | 0.0413 | 0.774 | 1.940 | 0.047 | 0.147 | 0.087 |

TABLE 2

OHHL and BMD effects on feed efficiency of broiler chickens

| OHHL (1 = no; 2 = yes) | BMD (1 = no; 2 = yes) | Feed Conversion | | | Mortality | | |
|---|---|---|---|---|---|---|---|
| | | Day 0-21 | Day 21-35 | Day 0-35 | Day 0-21 | Day 21-35 | Day 0-35 |
| 1 | | 1.397 | 1.784 | 1.634 | 2.0 | 0.7 | 2.7 |
| 2 | | 1.353 | 1.794 | 1.620 | 1.3 | 0.8 | 2.2 |
| Significance | | 0.012 | NS | 0.055 | NS | NS | NS |
| | 1 | 1.364 | 1.816 | 1.637 | 1.2 | 0.7 | 1.8 |
| | 2 | 1.386 | 1.762 | 1.617 | 2.2 | 0.8 | 3.0 |

TABLE 2-continued

OHHL and BMD effects on feed efficiency of broiler chickens

| (1 = no; 2 = yes) | (1 = no; 2 = yes) | Feed Conversion | | | Mortality | | |
|---|---|---|---|---|---|---|---|
| OHHL | BMD | Day 0-21 | Day 21-35 | Day 0-35 | Day 0-21 | Day 21-35 | Day 0-35 |
| Significance | | 0.071 | 0.000 | 0.014 | NS | NS | NS |
| Significance (OHHL *BMD) | | 0.025 | 0.094 | NS | NS | NS | NS |
| 1 | 1 | 1.372 | 1.820 | 1.644 | 1.3 | 0.7 | 2.0 |
| 2 | 1 | 1.357 | 1.812 | 1.629 | 1.0 | 0.7 | 1.7 |
| 1 | 2 | 1.422 | 1.749 | 1.624 | 2.7 | 0.7 | 3.3 |
| 2 | 2 | 1.350 | 1.775 | 1.610 | 1.7 | 1.0 | 2.7 |

NS, P > 0.10

TABLE 3

OHHL effect on dry matter disappearance, %

| | Hours | | | | |
|---|---|---|---|---|---|
| Treatment | 4 | 8 | 12 | 24 | Mean |
| Control | 48.8 | 58.4 | 62.3 | 74.4 | 61.0 |
| OHHL | 53.0 | 57.8 | 65.7 | 74.5 | 62.7 |
| OHHL − Control | 4.16 | −0.60 | 3.36 | 0.15 | 1.77 |

TABLE 4

Significance of independent variables for prediction of DM disappearance

| Variable | P value |
|---|---|
| Treatment | 0.105 |
| Sheep | 0.000 |
| Period | 0.023 |
| Study Day | 0.974 |
| Incubation time, hour | 0.000 |

References

The references mentioned herein are all expressly incorporated by reference.
1. Shapiro, Bacteria as multicellular organisms, Scientific American 246: 82-89, 1988.
2. Eberhard et al, Structural identification of autoinducer of photobacterium fisheri luciferase, Biochemistry, 20: 2444-2449, 1981.
3. Reprod. Nutr. Dev., 40: 189-202, 2000.
4. Erickson et al, Reprod. Nutr. Dev., 189-202, 2000.
5. WO01/74801 (University of Nottingham)

The invention claimed is:

1. In an animal feed providing improved animal performance, the improvement which comprises the incorporation in said animal feed of at least one autoinducer compound, in an amount effective to improve efficiency in the digestion of an animal receiving said animal feed, thereby improving animal performance, said autoinducer compound being an acyl homoserine lactone.

2. The animal feed of claim 1, wherein said animal feed comprises at least one of proteins, sugars, fats or fibre.

3. The animal feed of claim 1, wherein said animal feed is derived from cereals or other plant material.

4. The animal feed of claim 1, wherein the autoinducer compound is selected from a group consisting of N-oxobutanoyl homoserine lactone, N-oxopentanoyl homoserine lactone, N-oxohexanoyl homoserine lactone, N-oxoheptanoyl homoserine lactone, N-oxooctanoyl homoserine lactone, N-oxononanoyl homoserine lactone, N-oxodecanoyl homoserine lactone, N-butanoyl homoserine lactone, N-pentanoyl homoserine lactone, N-hexanoyl homoserine lactone, N-heptanoyl homoserine lactone, N-octanoyl homoserine lactone, N-nonanoyl homoserine lactone, and N-decanoyl homoserine lactone.

5. The animal feed of claim 1, wherein said autoinducer compound is represented by one of the formulae:

wherein X and Y are —O— and Z is a substituted or unsubstituted $C_1$ to $C_{20}$ acyl chain.

6. A non-therapeutic method of improving animal performance comprising administering to an animal selected from the group consisting of ruminant and monogastric animals an animal feed comprising at least one autoinducer compound, in an amount effective to improve efficiency in the digestion of an animal receiving said animal feed, thereby improving animal performance, said autoinducer compound being an acyl homoserine lactone.

7. The method of claim 6, wherein improving animal performance comprises improving animal growth rate, improving animal weight at a given age, improving feed conversion ratio, improving the yield or quality of a product produced by or derived from the animal.

8. The method of claim 7, wherein the product produced or derived from the animal is eggs, milk or meat.

9. The method of claim 6, wherein the animal feed is administered to birds, livestock, domestic or companion animals or marine animals.

10. The method of claim 9, wherein the animals are poultry, cattle, swine, sheep, rabbits, horses, dogs, cats or fish.

11. The method of claim 6, wherein the autoinducer is administered to the animal at a dose equivalent to 1 to 100,000 nanomoles per tonne of feed.

12. The method of claim 11, wherein the autoinducer is administered to the animal at a dose equivalent 100 to 10,000 nanomoles per tonne of feed.

13. The method of claim 6, wherein the autoinducer compound is formulated as a powder, a liquid, a capsule or tablet, a drench or a bolus.

14. The method of claim 6, wherein the autoinducer compound is obtained from plant, algal, fungal or bacterial material.

15. A method of making an improved animal feed, the method comprising the steps of:

a) providing an animal feed;
b) mixing with said animal feed at least one autoinducer compound, said autoinducer compound being an acyl homoserine lactone; and
c) optionally pelletizing the mixture obtained from step b, together with an inert carrier.

* * * * *